United States Patent [19]

Brower et al.

[11] 4,329,315
[45] May 11, 1982

[54] SHEET STRESS RELAXATION

[75] Inventors: Van P. Brower, Wilbraham; Harold H. Hopfe, Longmeadow, both of Mass.

[73] Assignee: Monsanto Company, St. Louis, Mo.

[21] Appl. No.: 200,238

[22] Filed: Oct. 24, 1980

[51] Int. Cl.³ .............................................. B29C 25/00
[52] U.S. Cl. .................................. 264/555; 264/230; 264/342 RE
[58] Field of Search ................. 264/342 RE, 555, 234, 264/571, 553, 230, 235, 342 R

[56] References Cited

U.S. PATENT DOCUMENTS

| | | | |
|---|---|---|---|
| 3,263,886 | 8/1966 | Smith | 226/95 |
| 3,385,490 | 5/1968 | Malmgren et al. | 226/7 |
| 3,632,726 | 1/1972 | Knox et al. | 264/342 RE |
| 3,679,791 | 7/1972 | Reade | 264/234 |
| 3,741,453 | 6/1973 | Pierce et al. | 226/7 |
| 3,868,286 | 2/1975 | Fariss et al. | 264/342 RE |
| 3,873,664 | 3/1975 | Curtis et al. | 264/234 |
| 3,979,038 | 7/1976 | Karlsson | 226/97 |
| 4,074,841 | 2/1978 | Kramer et al. | 226/97 |

FOREIGN PATENT DOCUMENTS 47-13541  4/1972  Japan .................................. 264/500

*Primary Examiner*—James B. Lowe
*Attorney, Agent, or Firm*—David Bennett; William J. Farrington; Paul D. Matukaitis

[57] ABSTRACT

The tensions in an extruded sheet of a thermoplastic can be relaxed by passing the preheated extruded sheet over a conveyor where it is supported on a cushion of heated air so as to maintain it at an elevated temperature while the tensions in the sheet are relaxed.

5 Claims, 2 Drawing Figures

SHEET STRESS RELAXATION

BACKGROUND OF THE INVENTION

This invention relates to a process for the relaxation of stresses in a plastic sheet material so as to minimize any subsequent tendency to shrink.

When a thermoplastic material is extruded to form a sheet or film, it is often found that subsequent re-heating leads to shrinkage or curling as a result of the relaxation of stresses built into the sheet or film during production. The extent to which this happens is dependent largely on the nature of the process, the polymer and the heat history of the polymer during production.

It is even possible to build stresses into a polymer sheet by conveying it via rollers rotating at slightly different speeds or by cooling one surface faster than another such as by contact with a roller at a different temperature to the surrounding air.

Where a film or sheet is to be thermoformed or laminated it is desirable that any in-built tendencies to shrink are relaxed before the thermoforming operation begins.

DISCUSSION OF THE PRIOR ART

One way in which troublesome in-built stresses can be relieved is by heating the sheet in an unconstrained state. This is in practice difficult to attain. An alternative is to place a roll of the sheet of film in a constant temperature enclosure and let the relaxation happen gradually.

Another approach is to feed the sheet (or film) through a heated relaxing zone at a rate slightly greater than that at which the sheet is wound up. In this mode the sheet tends to sag and thus impart stress rather than remove it.

It is also known to relax vinyl film by passing it through a heated zone while supported on a canvas conveyor. This however is not completely satisfactory in that contraction in the longitudinal direction tends to be opposed by frictional forces between the belt and the film.

The present invention provides a means of relaxing in-built stresses in a thermoplastic sheet using an in-line operation. One of the significant advantages of the invention is that the relaxed sheet requires no subsequent treatment but can be wound and shipped directly from the production line as rolls without fear of excessive shrinkage when used.

DESCRIPTION OF THE INVENTION

The present invention provides a process for the production of a relaxed thermoplastic polymer sheet which comprises:

A. delivering a preheated thermally stressed thermoplastic polymer sheet to a moving perforated conveyor;

B. providing a vacuum plenum beneath a first portion of the conveyor such that the polymer sheet is initially held in contact with the conveyor;

C. providing a source of heated gas under pressure beneath a second portion of the conveyor such that the sheet, as it moves from the region of the vacuum plenum, is supported on gas supplied from said source and is relaxed as it is forwarded; and D. forwarding and collecting the relaxed sheet at such a temperature and take up rate that no further stresses are imparted to the sheet.

The sheet is delivered to the conveyor in a preheated state and this can be accomplished by any convenient means such as heated rollers, infra-red heater batteries and the like.

The delivery of the sheet to the perforated conveyor can be by any conventional roller system or its equivalent and may often take place directly after a conventional sheet extrusion process before the wind-up. Alternatively a temporarily wound sheet may be unwound, relaxed using the above technique and then re-wound in the relaxed state.

The conveyor can be any one of those conventional used to air-transport films such as described in U.S. Pat. Nos. 2,848,820; 3,979,038; 3,678,599; and 3,957,187. The design of the perforations can be such as will assist in forwarding the sheet providing no stresses are caused thereby.

The temperature of the relaxing/supporting gas flow is such as to maintain the temperature at a level at which the polymer is softened sufficiently to release its tensions. While the temperature maintainance heat is primarily supplied by the supporting air, it may if desired be augmented by heaters placed above the sheet and supplying radiant heat thereto. For most polymers a temperature in the range of 40°–150° C. is adequate to ensure relaxation of tensions.

The conveyor can be horizontal but it is often useful to place it at an angle of up to 10° to the horizontal so as to facilitate motion of the supported sheet in the direction of movement of the conveyor belt.

DESCRIPTION OF THE DRAWINGS

The drawing attached hereto as

DESCRIPTION OF THE PREFERRED EMBODIMENT

The process of the invention is now more particularly described with reference to the attached FIG. 1 which illustrates an apparatus that may be used in the process.

Figure 1:
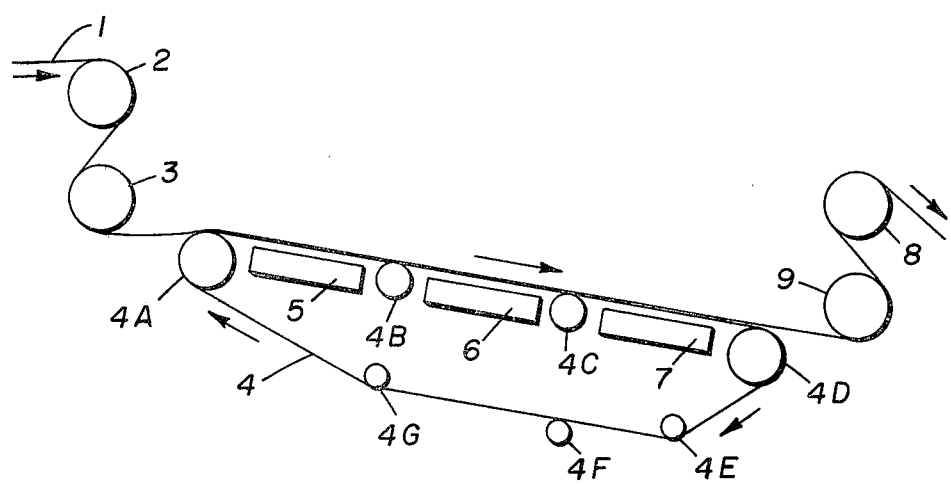
FIG. 1 is a side elevation, in simplified form of a relaxing conveyor according to the invention.

In FIG. 1, a sheet of a thermoplastic polymer, 1, in a stressed state is fed by way of a pair of heated rolls, 2 and 3, to the surface of conveyor belt, 4, carried on rollers, 4A to 4G, and having a surface perforated with air holes about 6 mm in diameter at a between-centers spacing of about 2.5 cm. The conveyor slopes gently downward from the point at which it is first contacted by the sheet at an angle of about 0°–10° to the horizontal.

Beneath the conveyor belt, at the point at which the sheet first contacts the belt, there is located a vacuum plenum, 5, that evacuates air through the perforations in the belt and effectively pins the sheet to the belt at that point.

Further down the conveyor in the direction of movement of the sheet, there are provided two pressure plena, 6 and 7, that force air through the perforations in the belt and provide a cushion of air on which the sheet is supported. The air is heated by heating means (not shown) so as to maintain a temperature adequate to relax substantially all the tensions in the sheet in the time it is subjected to the heated air. By providing that the sheet is riding on an air-cushion, it is ensured that no frictional interaction with the belt will significantly inhibit the relaxation.

After relaxation the sheet is picked up by cooled take up rolls, 8 and 9, and forwarded to a wind-up station not shown.

Figure 2:
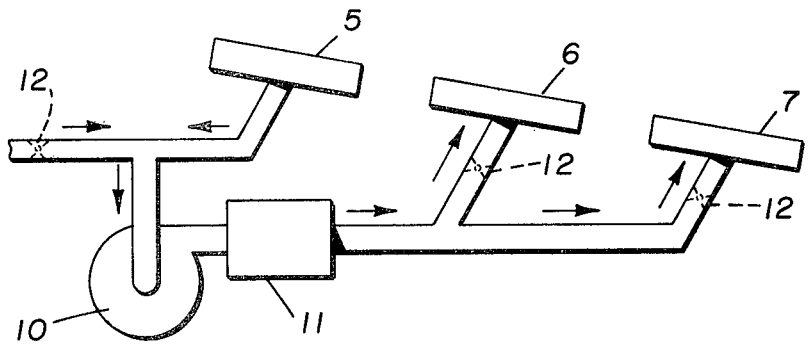
FIG. 2 is a diagrammatic illustration of a suitable means of generating balanced gas flows in the apparatus.

It is necessary that the forces exerted by the vacuum plenum and the plena providing the air support be balanced so that neither effectively overcomes the other. FIG. 2 shows an arrangement that can accomplish this end. In the drawing a blower, 10, derives its air supply from the vacuum plenum, 5, and blows it via a heater/filter, 11, to supply heated air to the support plena 6 and 7.

Dampers, 12, control access of air from the outside (if needed) to the blower and to the pressure plena. By varying the opening of the dampers the vacuum pressure and the sheet support pressures can be very effectively controlled.

As an illustration of the application of the process, a polyvinyl butyral sheet is relaxed using the apparatus illustrated in the drawings. The conveyor belt is about 1.2 meters wide and extends about 6 meters beyond the initial vacuum plenum section. The belt is tilted at about 5% to the horizontal in the direction of movement of the sheet. The air is supplied at 54°–60° C. to the sheet via the pressure plena to provide support and reduce frictional forces opposing shrinkage relaxation in the machine direction. The take-up rolls are operated at very low tension to avoid imparting any further strains to the sheet.

It has been calculated that the application of the above process in a typical sheet processing operation would yield a product with shrinkage of from 5 to 6% as opposed to the 10–11% usually experienced.

The foregoing description is for the purpose of illustration only and is not intended to imply any limitation on the scope of the invention. It is foreseen that minor modifications and variations could be made without departing from the central concept of the invention and it is intended that all such modifications and variations be included within the purview of this invention.

What is claimed is:

1. A process for the production of a relaxed thermoplastic polymer sheet which comprises:
   A. delivering a thermally stressed thermoplastic polymer sheet preheated to a temperature at which the sheet can relax the thermal stresses to a moving perforated conveyor;
   B. providing a vacuum plenum beneath a first portion of the conveyor such that the polymer sheet is initially held in contact with the conveyor;
   C. providing a source of heated gas under pressure beneath a second portion of the conveyor such that the sheet, as it moves from the region of the vacuum plenum, is supported on air supplied from said source and is thereby maintained at a stress relaxation temperature and relaxed as it is forwarded; and
   D. forwarding and collecting the relaxed sheet at such a temperature and take up rate that no further stresses are imparted to the sheet.

2. A process according to claim 1 in which the conveyor is tilted at an angle of up to 10° C. to the horizontal in the direction of movement of the sheet.

3. A process according to claim 1 in which the heated gas is air.

4. A process according to claim 1 in which heaters are located above the conveyor to augment the heat supplied to the sheet by the heated gas.

5. A process according to any one of claims 1 to 4 in which the temperature of the heated gas is from 40° to 150° C.

* * * * *